UNITED STATES PATENT OFFICE.

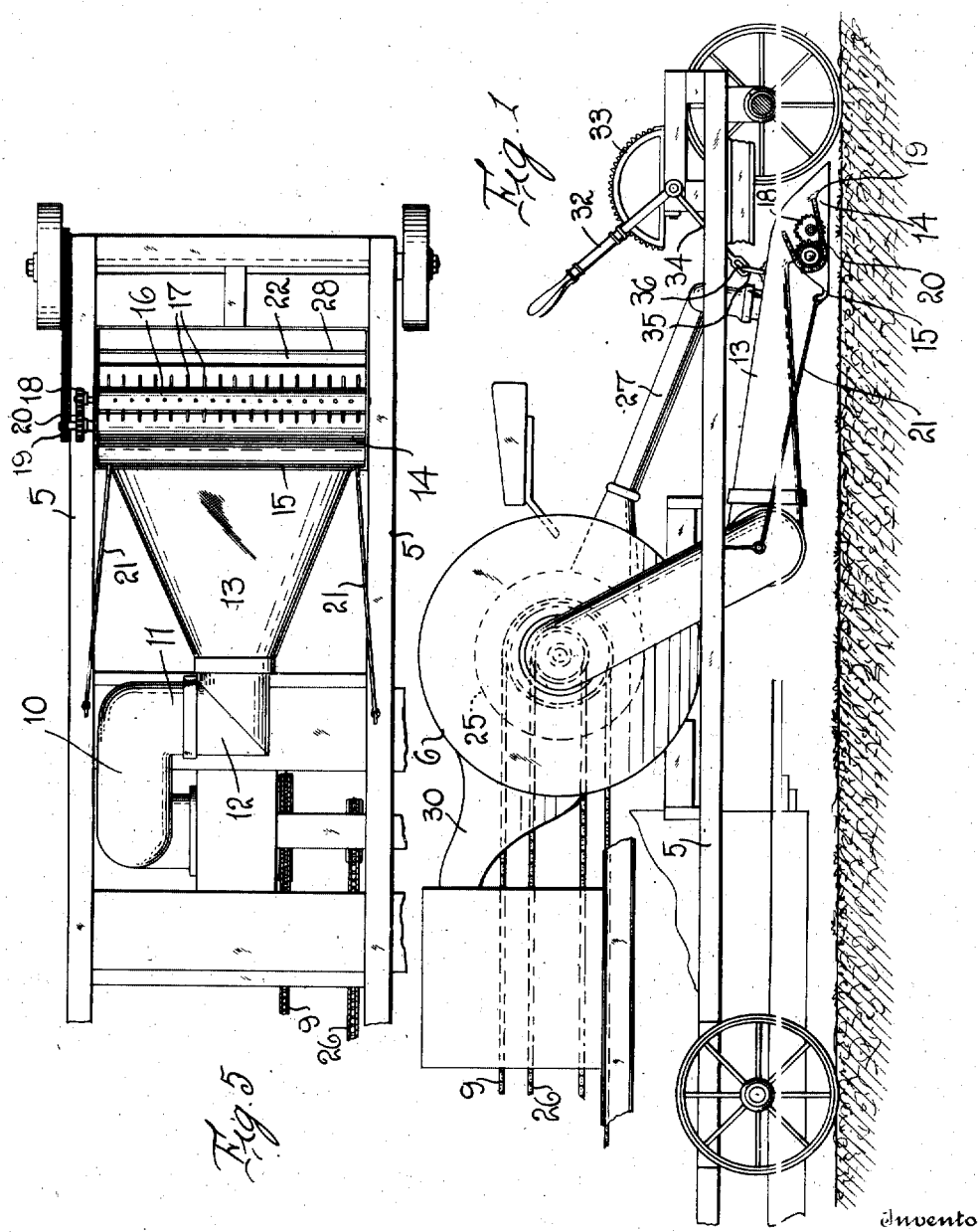

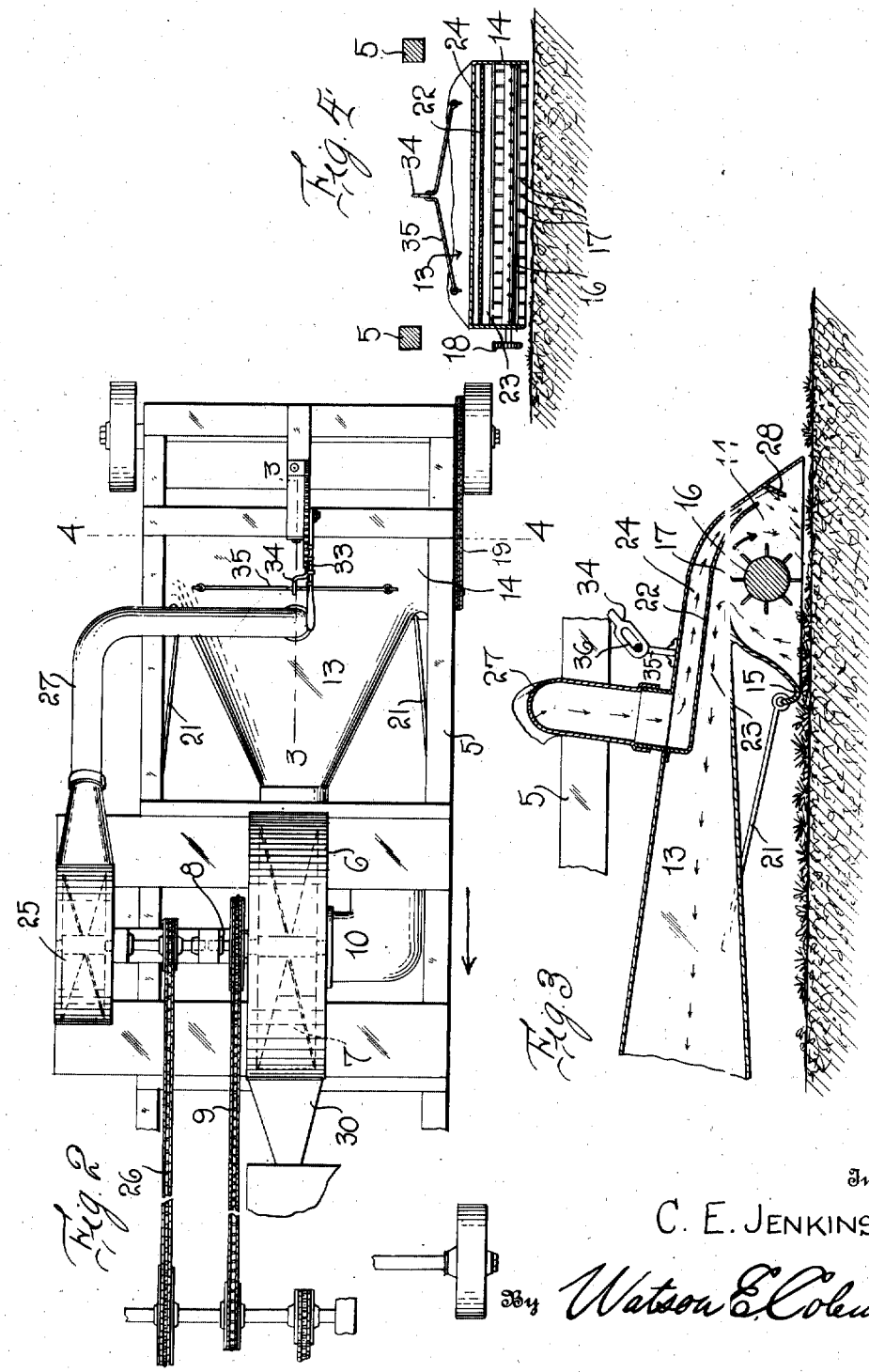

COLUMBUS E. JENKINS, OF HAGERMAN, IDAHO.

CLOVER-HARVESTER.

1,220,132.   Specification of Letters Patent.   Patented Mar. 20, 1917.

Application filed July 19, 1916. Serial No. 110,163.

*To all whom it may concern:*

Be it known that I, COLUMBUS E. JENKINS, a citizen of the United States, residing at Hagerman, in the county of Gooding and State of Idaho, have invented certain new and useful Improvements in Clover-Harvesters, of which the following is a specification, reference being had to the accompanying drawings.

This invention relates to an improved clover harvester and has for its primary object to provide simple and efficient mechanism which may be connected to or mounted upon a mowing machine to gather the clover cut by the mower as it travels over the ground.

It is one of the more particular objects of the invention to provide improved means for lifting the clover heads from the ground, and means for separating the uncut clover heads from the stems, in combination with an air suction nozzle into which the clover heads are drawn or collected and from which they are subsequently discharged.

It is another object of the invention to provide simple and serviceable means for mounting the suction nozzle so that its intake end may travel freely over the ground surface, and manually operable means for raising the suction nozzle to any desired position above the ground surface.

It is a further general object of the invention to provide a machine for the above purpose consisting of relatively few parts which are all of simple construction so that the machine can be produced at comparatively small manufacturing cost.

With the above and other objects in view, my invention consists in the novel features of construction, combination and arrangement of parts to be hereinafter more fully described, claimed and illustrated in the accompanying drawings, in which, Figure 1 is a side elevation of a portion of a clover harvesting machine constructed in accordance with the preferred embodiment of the invention;

Fig. 2 is a top plan view thereof;

Fig. 3 is a longitudinal section taken on the line 3—3 of Fig. 2;

Fig. 4 is a transverse section taken on the line 4—4 of Fig. 2; and

Fig. 5 is a bottom plan view of the suction nozzle, and supporting frame.

Referring in detail to the drawings, 5 designates the supporting frame which may be independently supported or which may be mounted upon or connected to the rear end of a harvester frame in any desired manner. Upon this frame 5 a large cylindrical fan casing 6 is suitably mounted, in which a suction fan 7 operates. The shaft 8 of this fan is connected by means of the operating chain 9 to a sprocket on a motor driven shaft, it being understood, however, that the suction fan might be driven from the traction wheels of the frame or from the mower mechanism. To one side of the fan casing 6, an outwardly extending pipe or conduit 10 is connected, and the lower end of this pipe is inwardly extended as at 11. An elbow 12 is coupled by a swivel connection at one of its ends to the angular end 11 of the conduit. To the other end of said elbow, a longitudinally extending suction nozzle or casing 13 is secured at its smaller end. The wider end of this casing or nozzle 13 is provided with a downwardly extending, flaring intake mouth 14. The lower edge of the forward side wall of this intake mouth is upwardly curved, as at 15, so that it may freely pass over obstructions or irregularities in the ground surface. Within the mouth 14 of the gathering nozzle, a longitudinally extending cylinder 16 is rotatably mounted, said cylinder being provided with a multiplicity of radially projecting teeth 17 arranged in staggered relation. On one end of said roller exteriorly of the intake mouth 14, is mounted a gear wheel 18 which is shown as driven by a sprocket driven gear wheel engaged by a chain 19 extending from the driving sprocket on the wheel axle or on the engine shaft. The suction nozzle is braced by means of the pull rods, indicated at 21, connected at their rear ends to the opposite ends of the curved edge 15 of the intake mouth 14, the other ends of these rods being loosely attached to eye bolts fixed in the longitudinal bars of the frame 5 in line with the axis of the elbow 12. Suitable means are provided for raising and lowering the intake mouth and also permitting the intake mouth to rise and fall.

A longitudinally extending, horizontal partition plate 22 is arranged within the gathering nozzle 13 and is fixed at its longitudinal and forward end edges to the top wall of said nozzle. Thus, the interior of the nozzle is divided into separate compartments designated 23 and 24 respectively. The compartment 23 is connected, through the medium of the pipe 10 and elbow 12, to the suction fan case. A second relatively small blast fan 25 is mounted upon the frame 5 and is also driven at a relatively high speed by means of the chain indicated at 26, from the engine shaft or wheel axle. This fan case is connected by means of a tube 27 to the compartment 24. The rear end of the partition wall 23 extends downwardly into the intake mouth 14 and is spaced from the rear side wall of said mouth. To this wall and in spaced parallel relation to the rear edge of the partition 23, an angularly disposed flange or lip 28 is secured. Against this lip, the fan 25 directs an air blast through the compartment 24. This blast of air striking the lip 28 is deflected forwardly and downwardly at an angle of approximately 45°. A strong blast of air striking the ground surface rearwardly of the toothed cylinder 16 raises the fallen or depressed clover heads from the surface of the ground. The suction through the compartment 23 created by the fan 7, draws the cut clover heads upwardly into the intake mouth 14 and through the compartment 23. The clover which has not been cut is raised by the air blast so that the teeth of the cylinder 16 will catch the clover heads and detach the same from the stems. In this manner, it will be seen that the clover is thoroughly and cleanly harvested or gathered as the machine is drawn over the ground. The fan case 6 is provided with an upwardly projecting outlet or discharge spout, indicated at 30, from which the clover is discharged into a box or other suitable receptacle arranged upon the frame 5 or upon the mower frame.

In practical use, the gathering casing or nozzle trails along the surface of the ground and follows the contour of the ground by reason of its pivoted and swivel engagement between the elbow 12 and the pipe 11 and between the casing 13 and the elbow. I have shown the wheels supporting the frame 5 but any other suitable supporting means which is proper for the purpose may be used. A lever 32 is fulcrumed upon a rack or quadrant 33 fixed to the frame 5, said lever being provided with the usual locking dog for engagement with the teeth of said rack. The lever 31 has an angular lower end portion 34, and to the top wall of the suction nozzle 13 the ends of a wire bail 35 are fixed. The extremity of the arm or extension 34 of the lever is slotted, as at 36, and through said slot the bail 35 extends. Thus, the nozzle or collecting casing 13 may move vertically with respect to the lever as it is drawn over the ground. The collecting nozzle may, however, be readily raised to an inoperative position by the manipulation of the lever 31, or said nozzle raised or lowered and suitably spaced from the surface of the ground. Of course the device may be used independently of the mower if desired.

From the foregoing description, taken in connection with the accompanying drawings, the construction, manner of operation and several advantages of my invention will be clearly and fully understood. The machine is very efficient and serviceable in practical operation, and as it consists of a comparatively few parts which are of simple construction, the device is not liable to get out of order or require frequent repair. It is apparent, of course, that the collecting nozzle or casing may be of any desired size, and the size of the suction and blast fans also varied accordingly.

While I have shown and described the preferred construction and arrangement of the several features of the device, it is to be understood that the same are susceptible of considerable modification therein, and I, therefore, reserve the privilege of adopting all such legitimate changes as may be fairly embodied within the spirit and scope of the invention as claimed.

Having thus fully described my invention, what I desire to claim and secure by Letters Patent is:—

1. In a clover harvester, a suction fan having a fan casing, a collecting nozzle connected to the fan casing, means mounted in the intake mouth of the nozzle to sever the heads of the clover whereby the same are drawn through the casing by the air suction, and means for directing an air blast upon the ground to raise the clover heads for engagement by the severing means.

2. In a clover harvester, a suction fan having a fan casing, a collecting nozzle connected to the fan casing and having two compartments each opening into the mouth of the nozzle, one of said compartments being in communication with the suction fan casing, and a blast fan connected to the other compartment of the nozzle to discharge an air blast therethrough upon the ground surface and agitate the clover heads whereby the same are drawn through the other compartment by the air suction.

3. In a clover harvester, a suction fan having a fan casing, a collecting nozzle connected to the fan casing, said nozzle having two compartments opening into the intake mouth of the nozzle, one of said compartments being in communication with the suction fan casing, means mounted in the intake mouth of the nozzle between the entrances to said chambers to sever the clover heads, and a blast fan connected to the other of said chambers to direct an air blast therethrough upon the ground contiguous to said severing means to raise the clover heads for engagement thereby.

4. In a clover harvester, a suction fan, a collecting nozzle having two compartments opening into the intake mouth of the nozzle in spaced relation to each other, a pipe connection between one of said compartments and the suction fan, a rotatably mounted toothed cylinder arranged in the intake mouth of the nozzle between the entrances to said compartments, a blast fan connected to the other of the compartments, and means for directing an air blast discharged through said compartment upon the ground contiguous to said cylinder to lift the clover heads whereby the same are engaged by the cylinder teeth.

5. In a clover harvester, a suction fan, a collecting nozzle having two compartments opening into the intake mouth of the nozzle in spaced relation to each other, a pipe connection between one of said compartments and the suction fan, a rotatably mounted toothed cylinder arranged in the intake mouth of the nozzle between the entrances to said compartments, a blast fan connected to the other of the compartments, and an angular deflecting lip secured to one wall of the nozzle in parallel relation to the open end of the latter chamber to direct the air blast discharged from said chamber downwardly upon the ground contiguous to the cylinder to raise the clover heads to be engaged and severed by the cylinder teeth.

6. In a clover harvester, a suction fan having a fan casing, a collecting nozzle connected to the fan casing and having a vertically movable, rigid conduit and an entrance mouth adapted to trail over the ground surface, means mounted in and secured to the entrance mouth of the nozzle to sever the clover heads, and means for raising the nozzle to an inoperative position.

7. In a clover harvester, a suction fan having a fan casing, having a conduit connected to one side of the fan casing, a collecting nozzle, a swivel connection between one end of the nozzle and said conduit, the other end of said nozzle having a flared entrance mouth to trail over the ground surface, means mounted in the nozzle mouth to sever the clover heads, a manually operable lever, and means connecting the nozzle to the lever for limited relative movement, whereby the nozzle may move vertically in traveling over uneven ground, said nozzle being elevated to an inoperative position by the manipulation of the lever.

8. In a clover harvester, a suction fan having a fan casing, a conduit connected to one side of the fan casing, a collecting nozzle, a swivel connection between one end of the nozzle and said conduit, said nozzle having separate compartments one of which is in communication with the conduit, said nozzle being provided with a flared intake mouth and said compartments opening into said mouth in spaced relation to each other, means mounted in the nozzle mouth to sever the clover heads, a blast fan connected to the other of said compartments and discharging an air blast into the nozzle mouth for engagement in the ground surface to raise the clover heads into position to be severed, and manually operable means connected to the collecting nozzle to raise and lower the same.

9. In a clover harvester, an air suction fan having a casing, a collecting nozzle connected to the fan casing to trail over the ground surface, means for raising the clover heads, and means for severing the clover heads and directing the same into the path of the air suction.

10. In a clover harvester, an air suction fan having a casing, a collecting nozzle connected to the fan casing to trail over the ground surface, means for severing the clover heads, and means for directing an air blast upon the ground to raise the clover heads for engagement by the severing means whereby the same are drawn into the fan casing by the air suction.

11. In a clover harvester, a collecting nozzle to trail over the ground surface, means for creating an air suction through the nozzle, and means for directing a blast of air upon the ground to raise the severed clover heads into the path of the air suction.

12. In a clover harvester, a collecting nozzle having a mouth to trail over the ground surface, an air suction fan connected to the nozzle, and a blast fan connected to the nozzle to deliver an air blast through the nozzle mouth and upon the ground surface, to raise the severed clover heads into the path of the air suction.

In testimony whereof I hereunto affix my signature in the presence of two witnesses.

COLUMBUS E. JENKINS.

Witnesses:
C. W. STRINGFIELD,
C. L. NELSON.